(12) United States Patent
Wildstone

(10) Patent No.: US 10,608,466 B1
(45) Date of Patent: Mar. 31, 2020

(54) PULSED DIRECT CURRENT POWER DISTRIBUTION

(71) Applicant: Amazon Technologies, Inc., Seattle, WA (US)

(72) Inventor: Kelsey Michelle Wildstone, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 296 days.

(21) Appl. No.: 15/624,106

(22) Filed: Jun. 15, 2017

(51) Int. Cl.
*H02J 9/06* (2006.01)

(52) U.S. Cl.
CPC .................................. *H02J 9/061* (2013.01)

(58) Field of Classification Search
CPC ..................................................... H02J 9/061
See application file for complete search history.

(56) References Cited

U.S. PATENT DOCUMENTS

| | | | | |
|---|---|---|---|---|
| 5,130,608 A * | 7/1992 | Zahardis | ............... | H05B 39/044 315/209 R |
| 9,081,568 B1 | 7/2015 | Ross et al. | | |
| 2001/0024099 A1 * | 9/2001 | Greif | .................... | H02P 25/0925 318/701 |
| 2007/0228835 A1 * | 10/2007 | Varzhabedian | ......... | H02J 7/027 307/66 |
| 2011/0094877 A1 * | 4/2011 | Gomez | .................... | C22B 3/045 204/229.4 |
| 2012/0319477 A1 * | 12/2012 | Brownlee | ............... | H02J 9/065 307/23 |
| 2014/0327467 A1 * | 11/2014 | Diewald | ................. | G01R 31/40 324/764.01 |

\* cited by examiner

*Primary Examiner* — Jared Fureman
*Assistant Examiner* — Emmanuel Dominique
(74) *Attorney, Agent, or Firm* — Blank Rome LLP

(57) ABSTRACT

A power distribution system in a datacenter generates and distributes a pulsed direct current (DC) voltage, instead of alternating current (AC) power or DC power. The system includes an uninterruptible power supply (UPS) and a breaker and may include multiple UPS's and multiple breakers. The UPS is configured to receive an AC voltage. The UPS includes a rechargeable battery and a pulsed DC circuit that generates the pulsed DC output voltage to drive a load external to the UPS. The pulsed DC output voltage comprises a periodic waveform including an on phase and an off phase. The UPS generates a timing signal indicative of occurrence of the off phase of the pulsed DC output voltage. The breaker provides the pulsed DC output voltage from the UPS to the load and decouples the pulsed DC output voltage from the load during an off phase upon detection of a fault condition.

19 Claims, 3 Drawing Sheets

PULSED DIRECT CURRENT POWER DISTRIBUTION

BACKGROUND

Organizations such as on-line retailers, Internet service providers, search providers, financial institutions, universities, and other computing-intensive organizations often conduct computer operations from large scale computing facilities. Such computing facilities (e.g., datacenters) house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. Datacenters receive alternating current (AC) power from the electric grid to provide the necessary operating power. Backup electric generators an uninterruptible power supplies may be included to permit the equipment to continue operating in the face of a power outage. Power supplies in the racks (or in the equipment in the racks) convert the AC voltage to one or more DC voltages for use by the equipment in the racks.

BRIEF DESCRIPTION OF THE DRAWINGS

For a detailed description of various examples, reference will now be made to the accompanying drawings in which.

DETAILED DESCRIPTION

Various embodiments are directed to a datacenter which distributes pulsed DC voltage throughout the datacenter. The pulsed voltage may be provided instead of, or in addition to, an AC voltage. By basing the distribution of electrical power on a pulsed DC voltage, instead of an AC voltage, efficiency may increase. The pulsed DC voltage is a cyclical voltage. Each cycle includes an "on phase" and an "off phase." During the on phase, the voltage is a DC voltage level (e.g., 600 volts). During the off phase, the voltage is much lower than during the on phase. In one example, the off phase is 0 volts. Circuit breakers may be included in the datacenter to shut down individual power circuits upon detection of a fault condition such as an over or under voltage fault or an over-current fault. Upon detection of a fault condition, the breaker may wait for the next occurrence of an off phase of the pulsed DC voltage and interrupt the power circuit at that point in time so as to avoid arcing which might occur if a power circuit was interrupted with the voltage at a higher level.

The term "datacenter" refers to a facility such as a building that includes electrical equipment such as servers, switches, routers, storage devices, etc. and in which computer operations are carried out. A datacenter may include servers dedicated to specific functions or serving multiple functions. Examples of computer operations include information processing, communications, simulations, and operational control.

Figure 1:
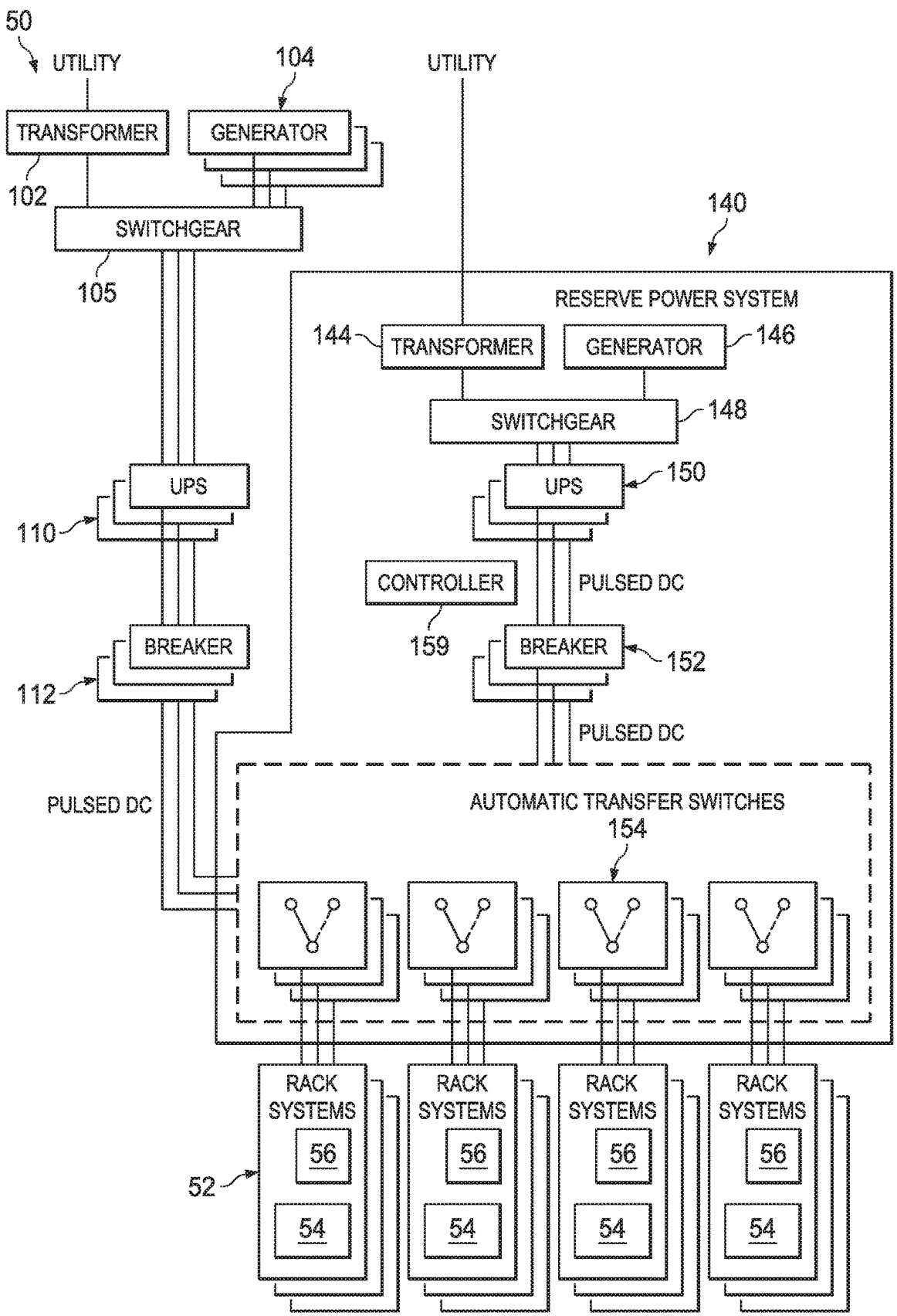
FIG. 1 illustrates a datacenter comprising a pulsed DC voltage distribution system in accordance with various examples.

FIG. 1 is a block diagram illustrating one embodiment of a datacenter having one or more primary power systems and a reserve power system that backs up the primary power systems for multiple rooms of the datacenter. Datacenter 50 includes racks 52, a primary power side and a reserve power side. The primary power side includes transformer 102, generators 104, switchgear 105, uninterruptible power supplies (UPS's) 110 and breakers 112. Various computer systems 54 housed in racks 52 may perform computing operations in data center 50. Computer systems 54 may be, for example, servers in a server room of the data center 50. Each UPS 110 distributes power to, for example, the servers in one room in the data center 50, but may provide power to other demarcations as well, such to individual racks 52. Each UPS 110 may receive an AC voltage from the switchgear 105, convert the AC voltage to a DC voltage, charge batteries internal to the UPS and, as described below, generate a pulsed DC output voltage for distribution through cabling in the datacenter to one or more racks 52. The voltage level of the pulsed DC voltage may be the same as or higher than the voltages needed by the computer systems 54 in the racks. Each rack 52 may include a rack power distribution unit 56. Rack power distribution units 56 may distribute power to computer systems 54. The rack power distribution units 56 may convert the incoming pulsed DC voltage to a lower level more suitable for the computer systems 54. Alternatively or additionally, the computer systems 54 may include power conditioning circuitry to convert the incoming pulsed DC voltage to levels usable for operating the components of the computer systems (e.g., processors, memory, etc.).

Transformer 102 is coupled to a utility feed. The utility feed may be a medium voltage feed. In some embodiments, the utility feed is at a voltage of about 13.5 kilovolts or 12.8 kilovolts and at a frequency of about 60 Hz. Generators 104 may provide power in the event of a failure of utility power to transformer 102. Each UPS 110 may provide uninterrupted power to one or more racks 52 in the event of a power failure upstream from the respective UPS 110.

Referring still to FIG. 1, a reserve power system 140 may provide reserve power for some or all of the computer systems 54 supplied by the primary side power system. In some embodiments, reserve power system 140 is powered up at all times during operation of data center 50, but remain operationally disconnected from the distribution feed to the racks 52 until a failure is detected of one or more components of the primary power side, at which time reserve power system 140 is switched into the distribution feed to the racks instead of the primary power side. Reserve power system 142 includes transformer 144 and generator 146. Transformer 144 may supply power to switchgear 148, as would the generator 146 if it were powered on.

Reserve power system 140 also includes an array of automatic transfer switches 154. Automatic transfer switches 154 may control switching of power to computer systems 54 between the primary power side and the reserve power system 140. In some embodiments, one automatic transfer switch is provided for each rack system (or a set of racks) in a computer room. Each automatic transfer switch 154 may switch input power to its respective rack(s) between the primary power side and the reserve power system. In another embodiment, an automatic transfer switch 154 is provided for a portion of a rack. In still another embodiment, automatic transfer switches may be provided at the server level. In certain embodiments, a reserve power system includes manual transfer switches. Manual transfer switches may be used, for example, to enable maintenance operations to be performed.

Although in the embodiment shown in FIG. 1, power to servers is switched between primary power and reserve power, in some embodiments, a datacenter may not have automatic transfer switches to switch between primary power and reserve power. In some embodiments, for example, servers in a rack system (such as computer systems 54 in racks 52) may be dual-supplied by two power systems or include power supplies that accept two or more power source inputs. A server may be sourced from two power feeds without an automatic transfer switch. In some embodiments, a redundant power system for servers in a datacenter may operate in an active-active failover configuration. In other embodiments, a redundant power system for servers in a datacenter may operate in an active-passive failover configuration.

Reserve power system 140 further includes controller 159, which may serve various control functions. In some embodiments, controller 159 controls some or all of automatic transfer switches 154 in reserve power system 140. In certain embodiments, controller 159 includes at least one programmable logic controller. The programmable logic controller may control some or all of the switching in or among devices in reserve power system 140.

In some embodiments, each automatic transfer switch 154 is internally controlled. The automatic transfer switch may include fault detection circuitry such that when a fault condition is detected in the primary power input, the automatic transfer switch automatically switches to reserve power. Thus, for the computer systems coupled to the switch, in the event of a failure in any of the elements on primary power side 100 upstream from an automatic transfer switch 154, including UPS 110 or switchgear 105, the automatic transfer switch may transfer input power from primary power to reserve power. Following such transfer, the computer systems (e.g., servers 54) that have been switched to reserve power may receive power from the reserve power system 140. In addition, the computer systems that have been switched to reserve power may be protected against power interruption by UPS 150.

In various embodiments, the system may include automatic transfer switches 154 at any level in a power chain. In some embodiments, a reserve power system may include automatic transfer between primary power system and backup power system at multiple levels in a power chain (for example, at a rack level and at a floor level). For example, a reserve power system may include automatic transfer switches at a UPS level and/or automatic transfer switches at a switchgear level of the power distribution chain.

Although reference numeral 54 in FIG. 1 refers to computer systems to be powered by the power delivery systems described herein, in general, any type of load can be so powered. Examples of such loads include computing devices, rack-mounted servers, network control devices (e.g., switches, routers, etc.), power supply units, air moving devices, and mass storage devices. Electrical systems may be supported in racks or external to racks. Electrical systems may perform various functions in a datacenter, such as data storage or network services. Examples of electrical systems that may be supplied with electrical power may include hospital equipment, utility systems, security systems, military systems, telecommunications systems, or electronic commerce systems. In certain embodiments, a load shedding system protects operation of a critical system, such as a life support system. In some embodiments, the systems are computing devices (for example, servers) in a datacenter.

The breakers 112 and 152 in FIG. 1 provide the pulsed DC voltage from the respective UPS 110,150 to the corresponding computer systems 54 in racks 52. In some embodiments, the power feed from a given UPS includes a single breaker, but multiple breakers may be provided in other embodiments. Each breaker is capable of interrupting the current flow to a given set of loads (e.g., computer systems 54) responsive to detection of a fault condition. Examples of fault conditions include over current, over voltage, or under voltage.

Figure 2:
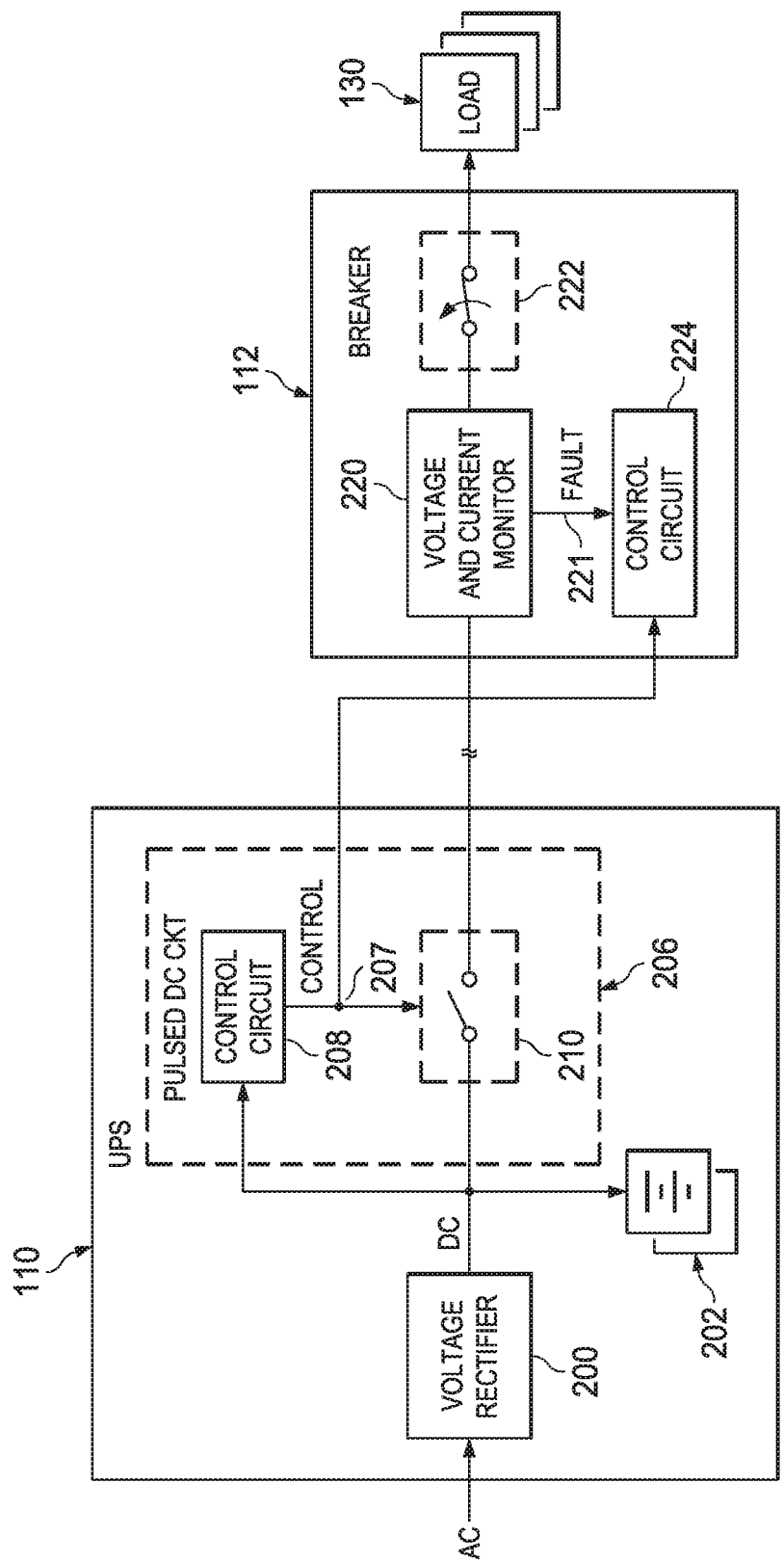
FIG. 2 shows a block diagram of an uninterruptible power supply to generate the pulsed DC voltage and a breaker coupled to the uninterruptible power supply in accordance with various examples.

FIG. 2 shows an example of an implementation of a UPS 110 (although it is applicable to UPS 150 as well) and a breaker 112 (applicable to breaker 152 a well). The UPS 110 includes a rectifier 200, one or more rechargeable batteries 202, and a pulsed DC circuit 206. The rectifier 200 converts an incoming AC voltage (e.g., an AC voltage from the switchgear 105) to a DC voltage. The rectifier 200 may comprise a diode bridge, insulated gate bipolar transistor (IGBT) converter, or other types of voltage rectifying circuitry, filters, etc. to produce a DC voltage that is provided to the pulsed DC circuit 206.

In the example of FIG. 2, the pulsed DC circuit 206 includes a control circuit 208 coupled to a power switch 210. The control circuit 208 may comprise a processor executing machine instructions (e.g., firmware), a programmable logic device, field programmable gate array, or other type of state machine circuit. The control circuit 208 generates a control signal 207 that causes the power switch 210 to be in an on or an off state. When in the on state, the DC voltage flows through to the load 130 through the breaker 112. When the power switch 210 is in the off state, the DC voltage is prevented from reaching the load. The loads 130 may comprise the computing systems 54. In some embodiments, the power switch 210 is a power metal oxide semiconductor field effect transistor (MOSFET), or IGBT, and in other embodiments the power switch 210 comprises multiple MOSFETs, IGBTs, or some combination thereof.

The DC voltage from the rectifier 200 charges one or more batteries 202. In the event of a power outage of the AC voltage, the batteries 202 can be used to power the load, at least until a generator 104 is brought on-line and made operational or until the loads can be gracefully shut down.

Figure 3:
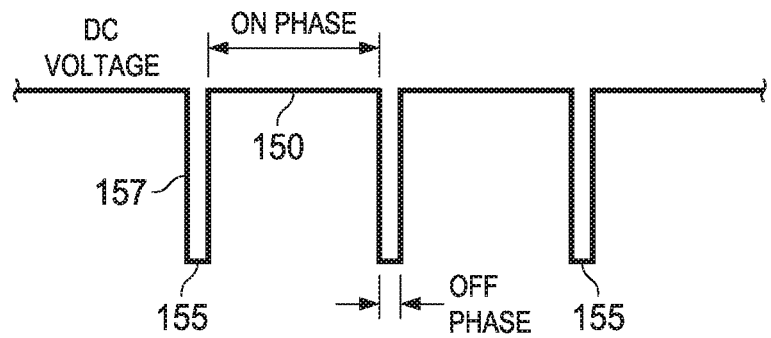
FIG. 3 illustrates a pulsed DC voltage waveform in accordance with various examples.

The control circuit 208 causes the power switch 210 to transition between the on and off states in such a manner as to generate the pulsed DC voltage to the load. FIG. 3 illustrates an example of the pulsed DC voltage waveform. The pulsed DC voltage is generally cyclical and each cycle includes an on phase 150 comprising the DC voltage and an off phase 155. The off phase may comprise 0 VDC, or another voltage less than the DC voltage of the on phase.

The length of the on phase plus the length of the off phase equals one complete cycle. In some embodiments, the duty cycle of the pulsed DC voltage is at least 90% meaning that the on phase is at least 90% of each complete cycle. Further, in some embodiments the length of the off phase is less than or equal to 16 milliseconds (ms) (e.g., 12 ms), although the length of the off phase can be longer than 16 ms in other embodiments. In some embodiments, the length of the off phase is less than 10 ms. The length of the off phase is short enough that the computer systems 54 which receive the pulsed DC voltage for their operation continue to operate normally even during the periodic off phases 155 of the pulsed DC voltage. Capacitors and inherent capacitance in the power input circuitry of each computing system 54 are charged during the on phases 150 and can continue to deliver electrical current during the off phase thereby maintaining the computing system's ability to survive a momentary off phase of the pulsed DC voltage. Of course, if the off phase 155 is too long, the computing system 54 will operate erratically in the face of frequent and excessively long power outages. The length of the off phase is application-specific and depends on the particular types of computing systems 54 in the datacenter 50. Testing can be performed on the computing systems 54 to be used in the datacenter to determine the maximum length of the off phase and a corresponding duty cycle of the pulsed DC voltage for which the computing systems can continue to operate normally. The control circuit 208 is configured to implement the on and off phases with a programmed duty cycle.

Referring again to the example of FIG. 2, each breaker 112 includes a voltage and current monitor 220, a power switch 222, and a control circuit 224. The voltage and current monitor 220 monitors the voltage and/or current levels of the pulsed DC voltage to the loads 130. The voltage and current monitor 220 may include a current transformer (CT), the voltage across which is representative of the current through the breaker to the load. The voltage across the CT may be compared to a threshold to detect an over current fault condition. A voltage comparator also may be included in the voltage and current monitor 220 to compare the pulsed DC voltage to preset thresholds to thereby detect over or under voltage fault conditions.

Upon detection of a fault condition, the voltage and current monitor 220 generates a fault signal (FAULT) 221 to the control circuit 224, which responds by causing the power switch 222 to transition to an off state. The power switch 222 (e.g., a spring-operated switching device designed for fast opening) is normally in its on state without any fault conditions, and is caused by the control circuit 224 to be in the off state to decouple the pulsed DC voltage form the load 130 upon occurrence of a fault condition.

In accordance with the disclosed embodiments, the control circuit 224 of the breaker 112 responds to detection of a fault condition by decoupling the pulsed DC voltage from the load 130 during an off phase 155. Upon receipt of the FAULT signal 221, the control circuit 224 may anticipate the next falling edge (157, FIG. 2) of the pulsed DC voltage which indicates the beginning of the off phase of the pulsed DC voltage. The control circuit 224 in the breaker synchronizes the decoupling of the pulsed DC voltage from the load 130 to the falling edge 157 (or at another time during the off phase 155) to break the flow of current to the load at a time when the voltage to the load is low to thereby mitigate arcing that might occur if the current was disconnected during the on phase 150. The control circuit 224 in the breaker 112 may determine when the off phases occur in other ways as well. For example, the control circuit 224 may couple to the pulsed DC voltage itself and directly detect the on and off phases 150, 155. Alternatively, the control signal 207 that the control circuit 208 generates for the power switch 210 in the UPS 110 also may be provided to the breaker's control circuit 224. The control circuit 224 then can detect the occurrence of the off phases 155 through examination of the control signal 207.

Figure 4:
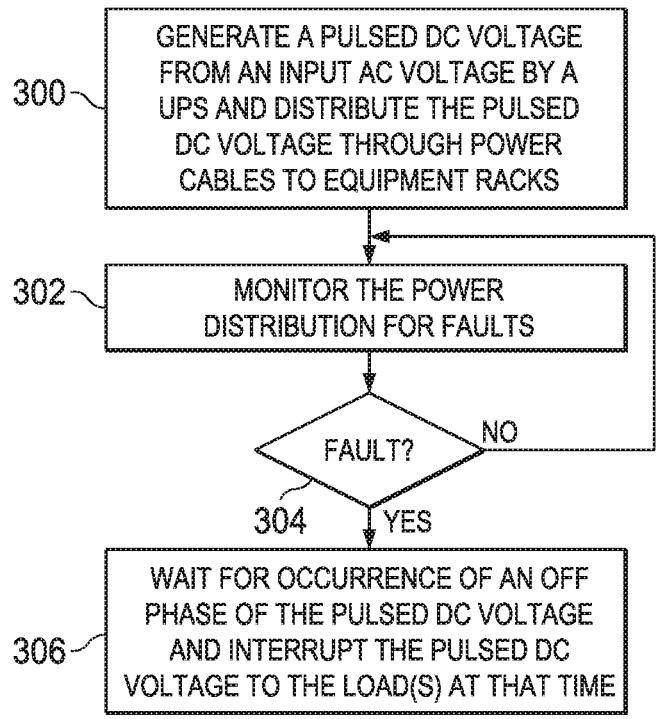
FIG. 4 illustrates a method of supplying pulsed DC voltage through a datacenter and shutting off power to equipment upon detection of a fault in accordance with an embodiment.

FIG. 4 illustrates a method in accordance with various embodiments. At 300, the method includes generating a pulsed DC voltage from an input AC voltage by a UPS or other source and distributing the pulsed DC voltage through one or more power cables and other types of power conductors to computing systems 54 in various racks 52. Rectifiers may be included to convert the input AC voltage to a DC voltage and a circuit (e.g., the pulsed DC circuit 206 of FIG. 2) may be used to generate the pulsed DC voltage. Some or all of the computing systems in the racks of the datacenter may be powered by the pulsed DC voltage.

At 302, the method further includes monitoring the power distribution to the computing systems powered by the pulsed DC voltage for faults (e.g., over current, over voltage, under voltage). If a fault is detected at 304, then at 306 the method includes waiting for the occurrence of an off phase of the pulsed DC voltage and interrupting the pulsed DC voltage to the load(s) at that time (during the off phase).

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
an uninterruptible power supply configured to receive an input alternating current (AC) voltage, wherein the uninterruptible power supply includes a rechargeable battery and a pulsed direct current (DC) circuit that is configured to generate a pulsed DC output voltage from the input AC voltage to drive a load external to the uninterruptible power supply, wherein the pulsed DC output voltage comprises a periodic on phase at the DC output voltage and a periodic off phase at zero volts, and wherein the uninterruptible power supply is configured to generate a timing signal indicating when the off phase of the pulsed DC output voltage occurs; and
a breaker coupled to the uninterruptible power supply, wherein the breaker is configured to provide the pulsed DC output voltage from the uninterruptible power supply to the load and, upon detection of a fault condition, to decouple the pulsed DC output voltage from the load during an off phase to avoid arcing.

2. The system of claim 1, wherein the pulsed DC output voltage has a duty cycle of at least 90%.

3. The system of claim 1, wherein the off phase is less than 16 milliseconds long.

4. The system of claim 1, wherein the pulsed DC output voltage has a duty cycle of at least 90% and the off phase is less than 16 milliseconds long.

5. The system of claim 1, wherein:
the uninterruptible power supply includes a rectifier to convert the input AC voltage to a DC voltage; and the pulsed DC circuit includes a control circuit and a power transistor to receive the DC voltage, wherein the control circuit is configured to generate the timing signal to turn the power transistor on and off to generate the pulsed DC output voltage.

6. A system, comprising:
an uninterruptible power supply (UPS) including:
  a voltage rectifier to convert an input alternating current (AC) voltage to a direct current (DC) voltage;
  a rechargeable battery to receive the DC voltage to charge the rechargeable battery;
  a control circuit; and
  a power switch circuit coupled to the voltage rectifier, wherein, in response to a control signal from the control circuit, the power switch circuit is configured to generate a pulsed DC voltage for a load;
  wherein the pulsed DC voltage is a periodic voltage including an on phase at the DC voltage and an off phase; and
the system further comprising a breaker coupled to the power switch circuit, the breaker configured to provide the pulsed DC voltage from the power switch circuit to the load and to decouple the pulsed DC voltage from the load during the off phase upon detection of a fault condition.

7. The system of claim 6, wherein the fault condition includes an over-current condition, an over-voltage condition, or an under-voltage condition.

8. The system of claim 6, wherein the breaker is configured to detect an occurrence of the off phase of the pulsed DC voltage and, responsive to the detection of the off phase, to decouple the pulsed DC voltage from the load.

9. The system of claim 6, wherein the breaker is configured to receive the control signal from the control circuit and to use the control signal to decouple the pulsed DC voltage from the load during the off phase upon detection of a fault condition.

10. The system of claim 9, wherein the breaker includes a second control circuit configured to synchronize decoupling of the pulsed DC voltage from the load to an edge of the control signal indicative of the off phase of the pulsed DC voltage.

11. The system of claim 6, wherein the pulsed DC output voltage has a duty cycle of at least 90%.

12. The system of claim 6, wherein the off phase is less than 16 milliseconds long.

13. The system of claim 6, wherein the pulsed DC output voltage has a duty cycle of at least 90% and the off phase is less than 12 milliseconds long.

14. A method, comprising:
  generating a pulsed direct current (DC) voltage from an input alternating current (AC) voltage, wherein the pulsed DC voltage comprises alternating on and off phases;
  distributing the pulsed DC voltage through power cables to equipment racks in a datacenter;
  monitoring the distributed pulsed DC voltage for a fault condition;
  detecting a fault condition; and
  detecting an off phase of the pulsed DC voltage and interrupting the pulsed DC voltage to the equipment racks during the detected off phase.

15. The method of claim 14, wherein each off phase is shorter than 16 ms.

16. The method of claim 14, wherein each off phase is shorter than 10 ms and a duty cycle of the pulsed DC voltage is at least 90%.

17. The method of claim 14, wherein generating the pulsed DC voltage comprises asserting a control signal to a circuit containing a power transistor to thereby turn the power transistor on and off.

18. The method of claim 17, further comprising providing the control signal to a control circuit, and wherein detecting the off phase comprises monitoring the control signal for an edge.

19. The method of claim 14, wherein detecting the off phase comprises monitoring the pulsed DC voltage.

* * * * *